(12) United States Patent
Majumdar et al.

(10) Patent No.: US 11,292,298 B2
(45) Date of Patent: Apr. 5, 2022

(54) NOISE DAMPER BONDED TO TIRE USING ADHESIVES

(71) Applicant: Triangle Tyre Co. Ltd., Weihai (CN)

(72) Inventors: Ramendra Nath Majumdar, Hudson, OH (US); Wang Dapeng, Weihai (CN); Zhang Tao, Weihai (CN)

(73) Assignee: Triangle Tyre Co. Ltd., Weihai (CN)

( * ) Notice: Subject to any disclaimer, the term of this patent is extended or adjusted under 35 U.S.C. 154(b) by 0 days.

(21) Appl. No.: 16/922,641

(22) Filed: Jul. 7, 2020

(65) Prior Publication Data
US 2020/0331305 A1 Oct. 22, 2020

Related U.S. Application Data

(63) Continuation-in-part of application No. 15/809,193, filed on Nov. 10, 2017, now abandoned.

(51) Int. Cl.
*B60C 5/14* (2006.01)
*B60C 19/00* (2006.01)
*B29D 30/00* (2006.01)
*B29C 65/00* (2006.01)
(Continued)

(52) U.S. Cl.
CPC ........ *B60C 19/002* (2013.01); *B29C 65/4825* (2013.01); *B29C 66/1162* (2013.01); *B29C 66/232* (2013.01); *B29C 66/5326* (2013.01); *B29C 66/727* (2013.01);
(Continued)

(58) Field of Classification Search
None
See application file for complete search history.

(56) References Cited

U.S. PATENT DOCUMENTS

| 4,895,610 A | 1/1990 | Egan |
| 6,837,287 B2 | 1/2005 | Smith, Sr. et al. |
| 6,915,826 B2 | 7/2005 | Poling et al. |
| (Continued) | | |

FOREIGN PATENT DOCUMENTS

| CN | 1669835 | * 9/2005 | ........... B60C 19/002 |
| CN | 105899377 | * 8/2016 | ............. B29C 73/22 |

OTHER PUBLICATIONS

Naoki CN 1669835 2005 English Translation (Year: 2005).*
(Continued)

*Primary Examiner* — Jacob T Minskey
*Assistant Examiner* — Adrien J Bernard
(74) *Attorney, Agent, or Firm* — Brian Harrod; George W. Moxon, II

(57) ABSTRACT

The invention relates to a tire comprising a circumferential tread having an outer tread surface and an inner innerliner surface; at least two spaced-apart beads; sidewall portions extending between the tread and the beads; and a belt-like foam noise damper having first and second terminal ends, wherein the noise damper lines the innerliner surface; wherein the noise damper is secured to the innerliner surface via an adhesive situated between the noise damper and the innerliner, wherein the terminal ends of the noise damper are cut at an angle of less than 90 degrees, overlap each other, and the overlapped second terminal end of the foam is joined to the first terminal end by the adhesive present underneath the second terminal end, and wherein the adhesive has weight in the range of 30 to 800 grams per square meter of foam surface.

18 Claims, 9 Drawing Sheets

(51) Int. Cl.
B29C 65/48 (2006.01)
B29L 30/00 (2006.01)
(52) U.S. Cl.
CPC ............ B29D 30/0061 (2013.01); B60C 5/14 (2013.01); *B29K 2995/0001* (2013.01); *B29L 2030/00* (2013.01)

(56) References Cited

U.S. PATENT DOCUMENTS

| | | |
|---|---|---|
| 6,962,181 B2 | 11/2005 | Deevers et al. |
| 7,073,550 B2 | 7/2006 | Reiter et al. |
| 7,332,047 B2 | 2/2008 | Majumdar et al. |
| 7,419,557 B2 | 9/2008 | Majumdar et al. |
| 7,662,480 B2 | 2/2010 | Resendes et al. |
| 7,674,344 B2 | 3/2010 | D'Sidocky et al. |
| 8,021,730 B2 | 9/2011 | Tsou et al. |
| 8,158,721 B2 | 4/2012 | Stevenson et al. |
| 8,293,049 B2 | 10/2012 | Incavo |
| 8,534,331 B2 | 9/2013 | Dubos et al. |
| 8,646,501 B2 | 2/2014 | Ruegg, Jr. |
| 8,776,851 B2 | 7/2014 | Majumdar |
| 8,946,319 B2 | 2/2015 | Adkinson et al. |
| 2005/0113502 A1 | 5/2005 | Fitzharris Wall et al. |
| 2005/0215684 A1 | 9/2005 | Fitzharris Wall |
| 2005/0217777 A1 | 10/2005 | Yukawa et al. |
| 2005/0222335 A1 | 10/2005 | Jones et al. |
| 2007/0044883 A1 | 3/2007 | D'Sidocky et al. |
| 2009/0205765 A1 | 8/2009 | Sostmann et al. |
| 2010/0276049 A1* | 11/2010 | Yukawa ............... B60C 19/002 152/450 |
| 2012/0148773 A1 | 6/2012 | Parent et al. |
| 2016/0068031 A1 | 3/2016 | Kaszas et al. |
| 2016/0347127 A1 | 12/2016 | Yukawa |
| 2018/0111427 A1* | 4/2018 | Seo ...................... B60C 1/0008 |

OTHER PUBLICATIONS

Yukawa CN105899377 2016 English Translation (Year: 2016).*
D. Adkinson, S. Malmberg, J. Bielby, and K. Kulbaba, "Butyl Ionomers—A New Grade of Butyl Rubber for Tire Applications", Rubber Division, American Chemical Society, Fall 186th technical Meeting, Paper # 45, Oct. 14-16, 2014.
D. Adkinson, S. Malmberg, J. Bielby, and K. Kulbaba, "Butyl Ionomers—A New Class of Butyl Rubber for Tire Inner Liner Applications", ITEC 2014, Paper # 41, Sep. 9, 2014.
G. Bohm, L Jia, and G. Stephanopoulos, "Core Rubber Recycling Problems and New Solutions", Tire Technology Expo, Hannover, Germany, Feb. 27, 2020.

* cited by examiner

NOISE DAMPER BONDED TO TIRE USING ADHESIVES

BACKGROUND OF THE INVENTION

The present invention is directed to a foam noise damper, for attaching inside pneumatic tires to dampen sound, where the terminal ends of the noise damper are such as to allow it to be installed without the need to bind the terminal ends of the noise damper by applying an adhesive between the two ends of the foam to improve production efficiency without sacrificing noise reduction performance.

It is known in the art that all carcasses of pneumatic green tires are built as a series of layers of flexible high modulus cords encased in a low modulus rubber; the cords in each layer are oriented in a chosen path or direction and substantially equally spaced and parallel. Before curing, the tire is often shaped by blowing air inside, and at that time substantial expansion occurs. Components with lower low strain modulus expand easier than components with higher low strain modulus. The pneumatic tire, whether belted radial ply or bias ply, is cured in a curing press using a curing bladder, which forces expansion and final shaping of the tire.

A noise damper precursor can be placed before a tire is cured. Such precursor contains blowing agents which forms foam due to heating to cure the tire. (See, for example U.S. Pat. No. 7,694,707 to Agostini and Leyssens).

Tire innerliner is often coated with silicone-based "Inside Tire Paint" for easy release from bladder mold. "Inside tire paints" are sprayed inside green tire so that tire releases easily from bladder mold, and usually contain silicone for easy release. To adhere foam directly to silicone coated innerliner, choice of adhesive is very limited as most adhesives do not bond strongly to silicone coated surface. One adhesive which is known to bond well to silicone coated innerliner surface is silicone adhesive which can be used to bond foam to innerliner without the need for cleaning the inneriner. (See, for example U.S. Pat. No. 7,368,024 to Majumdar et al. and US 2013/0032262 to Bormann et al.)

No prior art exists where noise damper is placed before tire cure on tire building drum and the noise damper expands with the expansion of the tire. However, prior art exists where noise damper is attached to already expanded green (uncured) tire and then curing the tire which eliminated the need for tedious and time consuming innerliner cleaning steps (See, for example *Polymers & Tyre Asia*, June/July 2012, p. 48; or Sandstrom, Majumdar, Sundkvist, Bormann, Pan, "Method for making pneumatic tire with foam noise damper"; EP 2397314 B1, May 29, 2013).

The use of foam with rectangular longitudinal cross-section is very common in commercial tire where the two ends are cut at an angle of 90 degrees and the ends of the foam are joined in a butt joint by an adhesive (examples: Goodyear SoundComfort tires and Michelin Acoustic tires). The foam length must be very close to the inner circumference of the tire to join the ends with a separate application of adhesive with negligible margin of error, which makes its application very cumbersome. This is done despite the fact that production efficiency is significantly lost by keeping the foam length exactly the same as internal circumference of tire (See, for example U.S. Pat. No. 7,213,624 to Yukawa and Hino). Suggestion to improve production efficiency by inserting foam inside tire by keeping a small gap between the foam ends (See, for example U.S. Pat. No. 7,213,624 to Yukawa and Hino). Some major tire companies insert one or more foam pieces keeping one or more gaps between foam ends (e.g. Continental's Contisilent tires, Pirelli's Pirelli Noise Cancelling System). New Tyre World Co., Ltd (NTW) who applies foam to aftermarket tires also keep small gap between foam ends cut at 90° angle. Instant patent application has demonstrated that noise reduction is sacrificed by keeping gap between foam ends (vide infra).

In the tire industry, a technology is highly desired where foam can be inserted with high production efficiency without sacrificing noise reduction performance which is hitherto missing.

The foam is a sponge like multi-cellular material, which may be provided with a water-impermeable outer coating to prevent water from infiltrating into the sponge like multi-cellular material. Typically, the foam has a belt-shape, a rectangular cross-section, and a flat surface. Foam with uneven surface or a patterned surface facing the cavity has also been employed. See, for example, U.S. Pat. No. 6,726,289 to Yukawa et al., which shows irregular surfaces, the teaching of which is incorporated herein by reference. Typically, the foam is adhered to tire innerliner using a pressure-sensitive adhesive, for example, a transfer adhesive or a double-sided adhesive tape. Usually the tire innerliner should be cleaned to remove silicone-based "Inside Tire Paint" for good bonding to the foam and for a wide choice of adhesives. Some silicone adhesives can be applied without cleaning the mold release composition. In many cases, the terminal ends of the foam are joined by an adhesive in an end-to-end butt joint by applying adhesive to the entire splice surface, or to save adhesive, by partially covering surface. Other means of placing foam inside tire without joining the terminal ends of the foam include the use of a coupling member. See, for example, U.S. Pat. No. 7,556,075 to A. Tanno, which teaches multiple pieces of noise dampers in a Low Noise Pneumatic Tire, as well as a variety of uneven noise damper surfaces for noise reduction.

U.S. Pat. No. 7,669,628 to N. Yukawa teaches a pneumatic tire having a noise damper, where the noise damper is fixed to the inner surface, using a double-sided adhesive tape, and the noise damper, where the ends of the damper are not connected, has a substantially constant cross-sectional shape along the entire circumferential length. Yukawa teaches an exception for the end portions of the damper, where in the case where the ends of the damper are not connected to each other, it is preferable that the end portions are tapered to prevent friction between the ends when the ends of the damper are not connected to each other using a glue or other means.

Tires can be normal tire (without a sealant layer), sealant tire where sealant is applied after the tire is cured, and built-in sealant tire where sealant is formed from precursor layer during tire cure. Tires where sealant is applied to cured tire has exposed sealant to tire cavity. Some major tire companies sell tires with exposed post-cure applied sealant layer as the mounted tire is not exposed to any significant contamination (example: Michelin, Continental). Sealant layers need to be tacky and thick (1-3 mm) to work as tire puncture sealant. To prevent contamination of sealant layer, presumably during storage, one major tire manufacturer's sealant tire is covered with thin film overlapping the film ends without an adhesive (example: Pirelli tire). Alternative way to prevent contamination presumably during storage is to apply thick foam layer overlapping the two ends without an adhesive at the foam ends which will simultaneously integrate sealant tire with noise reduction tire (US 2016/0347127, Dec. 1, 2016 to Yukawa). Manufacturers of tires with sealant protective layer do not need to attach the ends of overlapped material with an adhesive as the purpose is to prevent contamination before mounting as after mounting, no significant contamination will occur. During use of such tire, if not mounted in proper direction, the loose ends may open up by circulating air inside creating disturbance of air inside tire cavity which may enhance noise rather than reduce noise and may impair tire balance causing further increase in noise. In built-in sealant tires where sealant is applied before tire is cured, the sealant is placed inside the tire innerliner or a sealant cover layer is applied over the sealant layer to prevent contamination of tire curing bladder during tire cure (See, for example U.S. Pat. No. 4,895,610 to Egan; U.S. Pat. No. 10,399,991 to Majumdar et al.; U.S. Pat. No. 10,589,478 to Majumdar et al.). In such sealant tire, like normal non-sealant tires, separate adhesive is needed to bond foam to sealant tire.

The adhesive used to bond foam to tire innerliner should be as little as possible to prevent tire weight increase. Tire weight increase leads to reduction in fuel economy, increase in heat generation due to higher insulation which will reduce tire durability. The adhesive bond strength should be good enough to survive tire general operating temperature range −40° C. to +75° C. Temperature of −40° C. or even lower can be reached during winter in some cold area like Alaska or Canada. According to Bennetts ("Tire cavity thermometer", Tire Technology International, 2016, p. 38), inside air temperature of tire can go up to 75° C. but it may go even higher during summer in hot regions like Saudi Arabia.

SUMMARY OF THE INVENTION

The invention relates to a tire comprising a circumferential tread having an outer tread surface and an inner innerliner surface; at least two spaced-apart beads; sidewall portions extending between the tread and the beads; and a belt-like foam noise damper having first and second terminal ends, wherein the noise damper lines said innerliner surface; wherein the noise damper is secured to said innerliner surface via an adhesive situated between said noise damper and said innerliner, wherein the terminal ends of said noise damper are cut at an angle of less than 90 degrees, overlap each other, and the overlapped second terminal end of the foam is joined to the first terminal end by the adhesive present underneath the second terminal end, and wherein said adhesive has weight in the range of 30 to 800 grams per square meter of foam surface.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

The present invention is to a foam noise damper for a tire in which a tire carcass having a circumferential tread, at least one ply, at least two spaced-apart beads, and sidewall portions extending between the tread and the beads, has an adhesively secured noise damper which lines an inner surface of the tire and the terminal ends are cut at an angle of less than 90 degrees (in trapezoid longitudinal cross section, see FIGS. 2 & 2A), and overlap each other.

The present invention is to a noise damper for a normal tire or built-in sealant tire in which a tire has an adhesively secured foam noise damper which lines an inner surface of the tire and the terminal ends are cut at an angle of less than 90 degrees, overlap each other, and the overlapping terminal end of the foam is coated with an adhesive and the adhesive joins the overlapped terminal to the other terminal end. The adhesive underneath the entire foam surface is usually acrylic pressure-sensitive type can have thickness in the range 1-10 mil (0.025-0.25 mm). The adhesive can also be applied as 1-5 strip form and may cover less than 50% of area of the foam. The strip should be longitudinally placed along the length of the foam but it should be along the width at the location or near the location where the foam overlaps.

The present invention uses a belt-like foam where the two ends of foam are such that they are cut at an angle and will overlap. The length of the foam is longer than the internal circumference of the tire in which it is installed. So, when the longer side is coated with adhesive or used with an adhesive tape to adhere it to the tire, the splice will physically overlap. In doing so, the sound absorption achieved by the present invention, for example, was similar or better to that of foam where spliced ends were the exact length to cover the inner surface of a tire and were joined directly by a separate application of an adhesive. It is believed that some sound absorption is impaired by the adhesive present between the foam ends cut at 90° angle.

Figure 1:
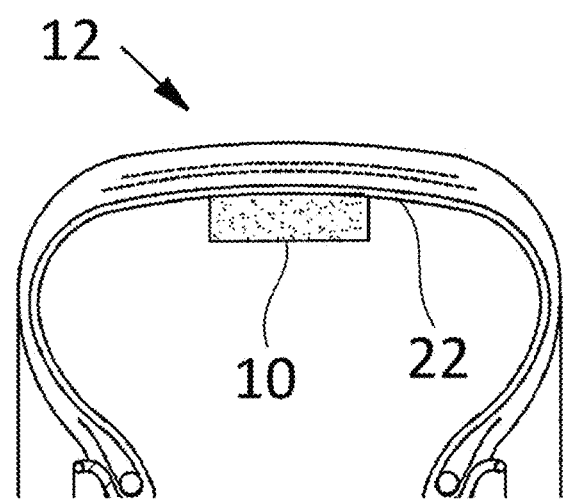
FIG. 1 is a bead-to-bead cross-sectional view of a tire showing a foam noise damper installed in a tire.
Figure 2:
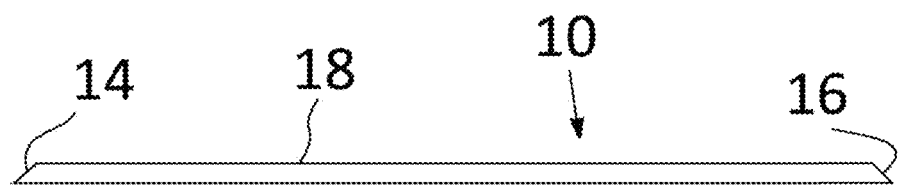
FIG. 2 is a longitudinal cross-sectional side view of a foam noise damper in accordance with the present invention having tapered ends.
Figure 2A:
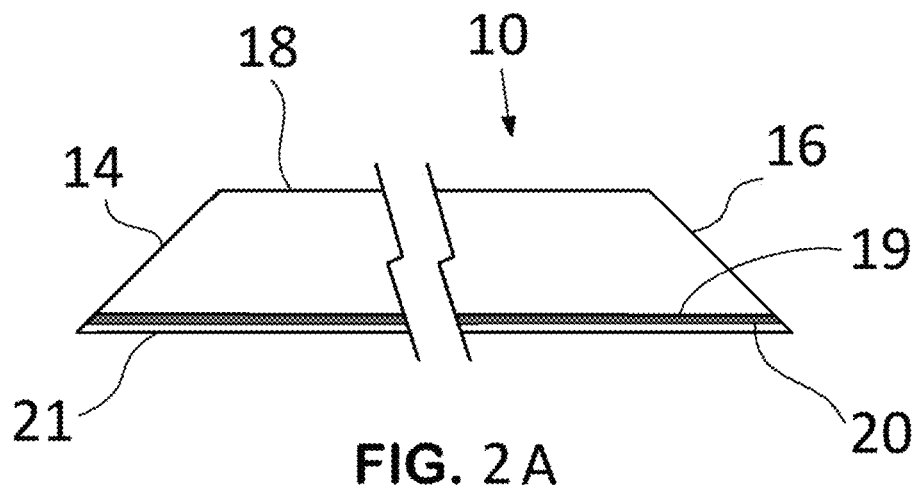
FIG. 2A is an enlarged view of FIG. 2, which further includes an adhesive layer and adhesive protective layer.

The foam 10 has a generally rectangular shape when taken in a cross-sectional view when installed in a tire 12 as shown in FIG. 1. But, the inner surface 18 (FIG. 2) of the foam can have a shaped surface that is wavy or has bumps as is known in the art. The cut ends 14, 16 of the foam 10 when taken along a longitudinal cross-sectional view, as shown in FIGS. 2 and 2A, describes a trapezoidal shape, wherein the length of the inner surface 18 is shorter than the length of the outer surface 19. An adhesive 20 is present in the longer side 19 of the foam when cut/died out from a roll where one side is coated with a pressure-sensitive adhesive. Alternatively, an adhesive can be applied to adhere the foam to the inner surface or innerliner 22 of the tire. The adhesive 20 can have an optional release agent coated paper cover/backing 21 that can be removed prior to applying the foam 10 to the inner surface of the tire.

Figure 3:
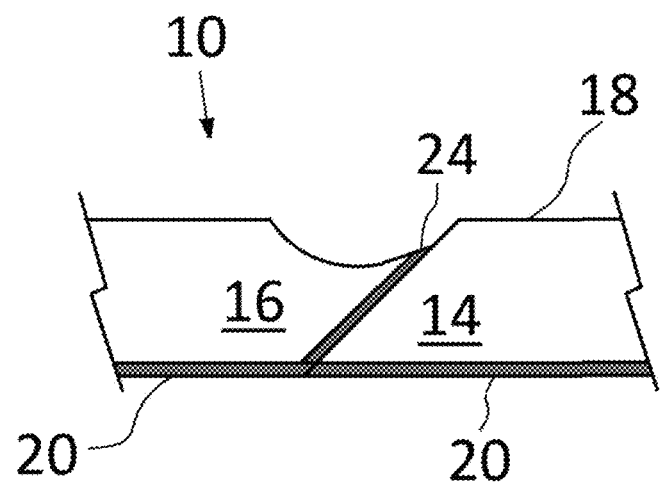
FIG. 3 is a longitudinal cross-sectional side view of a foam noise damper where one terminal end overlaps the other terminal end and they are joined by an adhesive applied to the overlapping terminal end underneath the foam.

Since the length of the foam is longer than the inner circumference of the tire, the terminal ends of the foam can overlap. A first terminal end 14 of the foam 10 can be adhered to the inside of the tire with the result that the second terminal end 16 will overlap the first terminal end 14, as shown in FIG. 3. The overlapping terminal end 16 will then be adhesively bonded to terminal end 14 with the adhesive 24 already present underneath the terminal end 16. (In this case, the adhesive of 24 is the same as the adhesive of 20).

An alternative embodiment involves applying the adhesive 20 to the foam 10, placing the foam into the tire. Another embodiment involves applying the adhesive 20 to the inside of the tire, placing the foam into the tire, then applying an adhesive 24 to the splice between the terminal ends 14, 16. Adhesive can cover the entire surface of foam or in strip form cover a partial area of foam. Quantity of adhesive use should be kept as low as possible to reduce overall tire weight which contributes to fuel economy from tire and less heat built-up due to less insulation which contributes to longer life of the tire.

Figure 4:
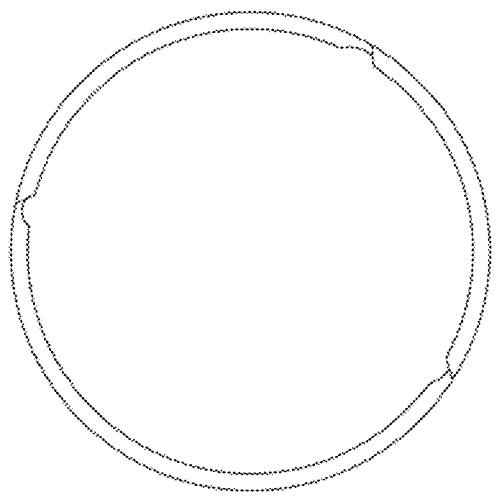
FIGS. 4-6 are annular cross-sectional views through the center of the tread of alternative applications of the noise damper in accordance with the present invention.
Figure 5:
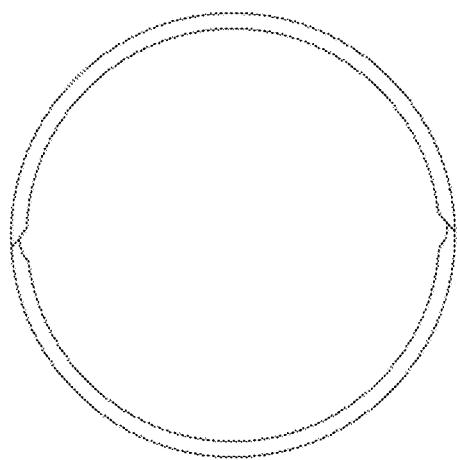
Figure 6:
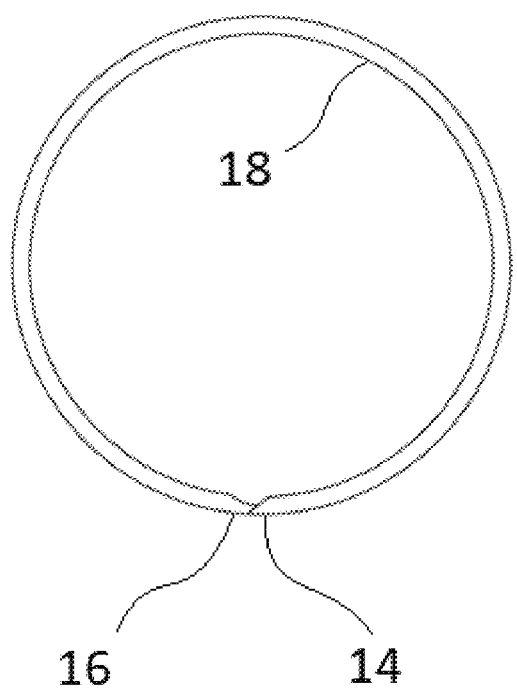

As is shown in FIGS. 4-6, the foam can be installed as a single piece (FIG. 6) or as multiple pieces. FIG. 4 shows an installation as three pieces, while FIG. 5 shows two pieces.

The angle of cut of the terminal end of the foam should be less than 90° and preferably between 65° and 5°, with 45° to 10° also being preferred. The angle on each end can be the same or different. The angles of the terminal ends are cut to form the foam into a trapezoidal shape.

The terminal end can be described as a right-angled triangle with angle being defined by the hypotenuse and the base. For example, for a foam having a thickness of 25 mm, at 45°, the base is 25 mm and hypotenuse is 35 mm, which would be a 100% overlap of the angled cut. At a 15° angle, the base would be 93 mm and the hypotenuse would be 96 mm. The overlap will be at least 1 mm up to 100 mm, with a preferred range of 48-96 mm representing respectively about 50-100% overlap.

The lower the angle, the more the margin of error in cutting the foam is allowed. When the angle is 45 degrees, for a foam thickness of 25 mm, the margin of error allowed is 18 mm, assuming a 50-100% overlap of the angled cut. When the angle is 15 degrees, the margin of error allowed is 58 mm, assuming 50-100% overlap. These splices assume a rectangular cross section, but other shapes can also be used for foams as are known in the art. The formula used is as follows:

$$25 \text{ mm}/x = \tan 15 = 0.2679$$

Thus, x=93.3 mm, the hypotenuse is 96 mm, and ½ of the hypotenuse would be 58 mm.

For a greater margin of error, a lower degree angle cut is preferred. However, if the angle is too small, such as 5°, then a part of the foam will be very thin and have increased chances of breaking/ripping. The acoustic foam can be polyester polyurethane or polyether polyurethane. The preferred polyurethane acoustic foam is polyether polyurethane due to its higher hydrolytic stability. The foam receives a water-repellent treatment and has a preferred specific gravity in the range of about 0.005-0.06. Most commercial foam in use has specific gravity are in the range 0.02-0.035. The volume of damper inside cavity is 0.4%-20%, while the thickness of foam is in the range 20-40 mm and more preferably in the range 25-35 mm.

For the present invention, one of the recommended adhesives is silane-modified polymer adhesive to be applied using a pneumatic gun. Teroson MS 9360 Silane modified polymer was used in the present invention. It should preferably be applied inside tire with clean innerliner in the form of 1-5 strips covering less than 50% of foam area and the overlapped end of the foam is joined by separate adhesive which instantly join the two ends so that the tire can be removed and stored for final bond formation without separation at the overlapped end.

For the present invention, another recommended adhesive is 2-component urethane adhesive. Application method is similar as silane-modified polymer adhesive onto clean innerliner. Some urethane adhesives cure readily and the same adhesive can be used in the overlapped area of the foam.

For the present invention, another recommended adhesive is an acrylic pressure-sensitive transfer adhesive be employed on the foam roll which is thin (1-10 mil) (0.001-0.010 in.) and they are generally applied to the entire area of the foam with higher surface area which is installed and attached to innerliner and to the overlapped area.

The installation of the noise damper is done in a known, conventional manner. For example, a tire can be built in such a way that the noise damper portion where the foam was attached was free of "inside tire paint." For example, U.S. Pat. Nos. 7,332,047; 7,419,557; 8,776,851; and 9,630,457, 10,632,799 all issued to Majumdar et al., the disclosure of which is incorporated herein by reference, teaches a thermoformable barrier film based on nylon or a film based on a blend nylon and rubber commonly referred to as dynamically vulcanized alloy (DVA).

A barrier film was employed in the '047 patent, wherein a removable "self-supporting barrier film of non-sulfur vulcanizable, expandable, thermoformable synthetic resinous material" is applied to the inner-surface of the tire, followed by "Inside Tire Paint" application, and curing to prevent "Inside Tire Paint" from contaminating the inner surface of the tire where foam will be adhered. After tire cure, the barrier film is removed and the foam is attached on the clean innerliner surface.

Tires with clean innerliner can also be generated by using a curing bladder with permanently cured release coat or by using non-silicone-based mold release agents. Such materials are available for example from ChemTrend or Rhein-Chemie. Tires with "Inside Tire Paint" coated innerliner can be cleaned as is known in the art.

There are three basic ways that a tire with noise-cancelling foam can be manufactured:

Method 1: Apply a thin layer of foam precursor containing blowing agent inside green (uncured) tire. During tire cure conditions (160° C./200 psi) foam is formed from the precursor when the tire comes out of the mold. This eliminates extra steps of applying foam to cured tire. Some patent literature exists (vide supra).

Method 2: Apply appropriate cured silicone foam inside green tire and then cure the composite at high temperature and pressure. It eliminates many post-cure tire application steps (vide supra).

Method 3: Apply appropriate cured polyurethane foam to cured tire. Take cured foam and adhered to cured tire with an adhesive. Presently, all commercial tires with foam noise damper are made this way.

Best Way to Carry Out the Invention (with Fast Cure Urethane Adhesive):

Take a foam strip where the first end is cut at 45° angle, and the total length of the foam is longer than the internal circumference of tire. The second end is left uncut since this end will eventually be cut off. Apply an adhesive strip having a width less than half the width of the foam centrally and circumferentially inside tire. Next, apply adhesive at one end cut at 45° angle (see FIGS. 7, 8A). Insert foam with the adhesive end first, pressing inside tire until the other end overlaps the foam end coated with adhesive. After suitable bond strength development, cut out the excess foam so that in no location of the foam inside tire, the thickness of the foam is greater than 1.5 times the total thickness of the foam and preferably close to one. This way, one inventory of foam can be used for multiple size tire inside diameters.

Alternate Way to Carry Out the Invention (Slow Cure Silane-Modified Polymer Adhesive and Instant Adhesive at the Foam Overlap Region)

Apply 4 narrow strips (each strip <10% of foam width) strips of slow cure (>1 hour for some bond formation) adhesive inside tire circumferentially along the inner surface of the tire. The strips should be equally and maximally spaced, with the total cover width of adhesive being less than 50% of the foam width. Apply two strips perpendicular to the four strips so that they are close to the two foam ends after application and length of two perpendicular strips is close to the width of the foam. (See FIGS. 8B, 9, 11). Insert foam with the end cut at 45° angle first and joined to other end by applying instant adhesive. Cut out the excess foam as described above. Instant adhesive can be acrylic pressure-sensitive adhesive pre-applied at the foam end cut at an angle of 45°. Instant adhesive can also be cyanoacrylate type glue for application at the time of foam installation which is well known and readily available but was not used in testing in the instant patent application.

Alternate Way to Carry Out the Invention (Pressure Sensitive Adhesive)

Select an acoustic foam 10 of appropriate thickness (for example, polyether polyurethane of density 0.03 g/cm$^3$ and a thickness of 25 mm) with tapered ends (as in FIG. 2), the longer side 19 of which is coated with pressure sensitive adhesive 20 through a foam converter. The terminal ends are cut to provide tapered ends 14, 16. The pressure sensitive adhesive 20 is protected with a release coated paper 21 which will be removed just before application to tire. Cut the foam with adhesive to appropriate width e.g. 9 cm wide and the ends at an angle of about 20°. The length of the foam should be longer than the internal circumference of the tire where it will be applied. This may also be done by foam converter. The inside of the tire innerliner should be clean and free of "Inside Tire Paint" and the foam noise damper is attach inside the tire with gradual removal of the protective release paper overlapping the other foam end and joined by the adhesive present underneath the foam. The foam noise damper can be applied as a one-piece foam or multiple pieces or sections of foam as shown in FIGS. 4-6. The length of the foam is such that in no location of the tire, the overlapped foam thickness is greater than 1.5 times the thickness of the non-overlapped foam but preferable 1.0 or less than 1.0 times the thickness of the foam.

Most adhesives will require a tire with clean innerliner where the noise damper will be applied. However, some silicone adhesives are known which bond strongly to tire noise damper without removing the silicone based "Inside Tire Paint" e.g. Loctite Silicone 5900 or Loctite Silicone 5910, or Loctite SI 5930 FIT from Henkel or HS-90955 from Sungwon/NTW. (See, U.S. Pat. No. 7,368,024 to Majumdar et al. or US Pub. No. 2013/0032262 to Bormann et al.).

In commercial tires with foam, splice of foam is cut at an angle of 90° and joined by an adhesive. The foam must be of exact length as inner circumference of the tire with very little margin of error. Moreover, two tires even from the same batch may have slight difference in internal circumference. If the foam is cut slightly shorter than the inner circumference of the tire, scrap foam will be generated, resulting in waste. With the present invention, there is a greater margin of error, and less scrap is produced. In the present invention, if the cut is at an angle of less than 90°, preferably at a 45° angle. Other angles are possible, such as 5 to 65 degrees, 10 to 40 degrees, or 40 to 50 degrees. 15 degrees is also a preferred angle.

Example

Four identical sets of tires were manufactured where innerliner was kept clean as in U.S. Pat. No. 7,332,047. Pressure-sensitive acrylic adhesive (5 mil thick) coated foam were inserted in the same manner with the only difference being that for a first set, the foam was cut at 90° and the terminal ends left unjoined with a little gap, the next or second set was made using a foam where the terminal ends were cut at 45° and the terminal ends were left unjoined with a little gap. The third set of tires were made using a foam where terminal ends were cut at 90° and the terminal ends were adhesively joined (as represented in the prior art), and the fourth set was made using foam where the terminal ends were cut at 45° and the terminal ends overlapped and joined by the pressure sensitive adhesive present between the top of the one terminal end of the foam and underneath the overlapped terminal end of the foam. Experimental tires were mounted on a vehicle and the noise reduction was measured at the left ear of the driver's side of the vehicle cabin in an anechoic chamber and the results were as follows:

TABLE 1

| Noise reduction (decibels, dBa) | |
| --- | --- |
| Small gap between foam and ends cut at 90° | −0.64 |
| Small gap between terminal ends cut at 45° | −1.33 |
| Terminal ends cut at 90° angle, and splice joined by an adhesive | −2.47 |
| Terminal ends cut at 45°, overlapped, and the overlapped terminal end joined by an adhesive present on the other terminal end (Present Invention) | −2.69 |

As Table 1 shows, the present invention yielded the best results.

Preliminary Adhesives Screening on Different Innerliner Test Surfaces

Three different types of innerliner surfaces were prepared:
   Clean Innerliner with no "Inside Tire Paint"
   Innerliner coated with Chem-trend ML-7045 "Inside Tire Paint".
   Innerliner coated with Munch IP-1154/2 "Inside Tire Paint".

Four adhesives were evaluated on the above-mentioned 3 innerliner test surfaces and they are as follows:
   Technomelt 6650 pressure sensitive adhesive from Henkel (abbreviated as 6650).
   Technomelt 8668 pressure sensitive adhesive from Henkel (abbreviated as 8668).
   Alkoxy Silicone Adhesive: Loctite® SI 5930™ FIT from Henkel (abbreviated as Silicone).

Solventless Silane-modified polymer Adhesive: Teroson® MS 9360™ from Henkel (abbreviated as Silane-modified polymer)

Cylinders of diameter 1" and length ¾ inches were died out from foam or pressure sensitive adhesive coated foam. Test pieces were prepared where one side of cylinder was attached to test surface with adhesive at the interface. Three test pieces from each of three adhesives were prepared on each of three test surfaces and they were left for 24+ hours. Then they were placed inside oven at 75° C. for 2-4 hours and then hand pulled and gave subjective points in the range 1-10. Cumulative ratings of these 4 adhesives on these three test surfaces are shown in Tables 2-4. Maximum cumulative points of 30 is attainable when foam tore without separation at the interface.

TABLE 2

Preliminary adhesive ranking at 75° C. on clean innerliner test surface

| Adhesive | Cumulative Points | Ranking |
|---|---|---|
| 6650 | 19 | 3 |
| 8668 | 21 | 2 |
| Silane-modified polymer | 30 | 1 |
| Silicone | 18 | 4 |

TABLE 3

Preliminary adhesive ranking at 75° C. on test surface coated with Chem-trend ML-7045 "Inside Tire Paint"

| Adhesive | Cumulative Points | Ranking |
|---|---|---|
| 6650 | 17 | 3 |
| 8668 | 12 | 4 |
| Silane-modified polymer | 30 | 1 |
| Silicone | 18 | 2 |

TABLE 4

Preliminary adhesive ranking at 75° C. on test surface coated with Munch IP-1154/2 "Inside Tire Paint"

| Adhesive | Cumulative Points | Ranking |
|---|---|---|
| 6650 | 16 | 3 |
| 8668 | 14 | 4 |
| Silane-modified polymer | 21 | 2 |
| Silicone | 22 | 1 |

Adhesive Screening for Attaching Foam Inside Tire

Adhesion depends on type of "Inside Tire Paint" utilized by tire plants. For example, silicone is the worst adhesive out of the 4 tested (Table 2) if innerliner is clean. If innerliner is coated with Munch IP-1154/2 "Inside Tire Paint", then silicone adhesive shows best subjective value of 22, but significantly less than silane-modified polymer with clean innerliner subjective value of 30 (Tables 2 and 4). Because generally highest adhesion value is obtained with clean innerliner, in all tire builds, tire with clean innerliner was utilized. Moreover, different tire factory may use different "Inside Tire Paint" and hence it is advisable to use clean tire innerliner so that the same adhesive works irrespective of the "Inside Tire Paint" utilized by tire factory. Based on screening test on clean innerliner test surface, 8668 and silane-modified polymer adhesives are selected for further detailed evaluation.

Foam-to-Innerliner 180° Peel Adhesion Using Different Adhesives at Interface

Clean innerliner free of "Inside Tire Paint" was utilized.

Two of the four adhesives after initial screening for further detailed evaluation are discussed above. Besides 8668 and silane-modified polymer adhesives, also evaluated was dual coated adhesive where onto 8668 coated foam, silane-modified polymer adhesive was applied. Two component Lord 7545 A/B urethane adhesive from Lord Corporation was also evaluated.

Adhesion test pieces were kept at room temperature for 7+ days for full strength development. Then peel strengths were measured inside conditioned chambers at 3 different temperatures are shown in Table 5. Test was conducted after preparing standard 180° Peel Adhesion test pieces using Instron equipment.

Immediate peel adhesion value with 8668 adhesive after pressing at 23° C. was 1.31 lb/inch and it increased to 3.20 lb/inch if pressing was done at 100° C.

TABLE 5

Foam to clean innerliner bond strengths at three different temperatures

| Adhesive | Temp (° C.) | Adhesion (lb/inch) | Comments |
|---|---|---|---|
| 8668 | −40 | 7.05+ | Foam tore from jaw |
| Silane-modified polymer | −40 | 5.9+ | Foam tore from jaw |
| Silane-modified polymer over 8668 | −40 | 12.51+ | Foam tore from jaw |
| Urethane | −40 | 8.47+ | Foam tore from jaw |
| 8668 | 23 | 5.61 | Cohesive failure with adhesive on both foam and innerliner |
| Silane-modified polymer | 23 | 4.4+ | Foam tore from jaw |
| Silane-modified polymer over 8668 | 23 | 3.79+ | Foam tore from jaw |
| Urethane | 23 | 3.94+ | Foam tore from jaw |
| 8668 | 75 | 0.48 | Adhesive failure with adhesive on innerliner |
| Silane-modified polymer | 75 | 1.21+ | Thin layer of foam on Silane-modified polymer |
| Silane-modified polymer over 8668 | 75 | 1.61 | Adhesive failure of 8668 from Silane-modified polymer |
| Urethane | 75 | 1.42+ | Layer of foam separated from adhesive |

Note:
Appreciable bond strength is developed instantly with 8668 adhesive, it took 5 minutes to develop some bond strength with Urethane and it took several hours to develop bond strength with silane-modified polymer.

Foam-to-Foam 180° Peel Adhesion Using Different Adhesives at Interface

Similar as Innerliner-to-foam adhesion where innerliner is replaced with foam. Results are shown in Table 6. X16013: It is 5 mil acrylic pressure sensitive adhesive from Adhesive Applications.

TABLE 6

Foam to foam 180° peel adhesion at three different temperatures

| Adhesive | Temp | Adhesion (lb/inch) | Comments |
|---|---|---|---|
| X16013 (Pressed at 23° C.) | −40 | 7.73+ | Tore from jaw |
| X16013 (Pressed at 100° C.) | −40 | 9.36+ | Tore from jaw |

TABLE 6-continued

Foam to foam 180° peel adhesion at three different temperatures

| Adhesive | Temp | Adhesion (lb/inch) | Comments |
|---|---|---|---|
| Urethane | −40 | 9.27+ | Foam tore |
| X16013 (Pressed at 23° C.) | 23 | 3.93+ | Foam tore |
| X16013 (Pressed at 100° C.) | 23 | 4.23 | Adhesive failure |
| Urethane | 23 | 4.79+ | Foam tore |
| X16013 (Pressed at 23° C.) | 75 | 0.63 | Adhesive failure |
| X16013 (Pressed at 100° C.) | 75 | 0.74 | Cohesive failure |
| Urethane | 75 | 2.87+ | Foam tore |

Foam-to-Foam Lap Shear Adhesion

Two 1"×3" foam pieces were taken. Lap shear adhesion test pieces were prepared by overlapping 1"X1" of the above two pieces so that the total length of the joined piece is 5". Immediate lap shear adhesion and after 7+ days are shown in Table 7.

TABLE 7

Foam-to-foam lap shear adhesion

| Adhesive | Lag Time | Temp. (° C.) | Adhesion (lb/inch$^2$) | Comments |
|---|---|---|---|---|
| X16013 (Pressed at 23° C.) | 7+ days | −40 | 13.74+ | Tore from jaw |
| X16013 (Pressed at 100° C.) | 7+ days | −40 | 13.79+ | Tore from jaw |
| X16013 (Pressed at 23° C.) | Immediate | 23 | 6.47 | Slided |
| X16013 (Pressed at 23° C.) | 7+ days | 23 | 7.98+ | Tore from jaw |
| X16013 (Pressed at 100° C.) | 7+ days | 23 | 8.23+ | Foam tore |
| X16013 (Pressed at 23° C.) | 7+ days | 75 | 4.48 | Slided (Cohesive) |
| X16013 (Pressed at 100° C.) | 7+ days | 75 | 5.1+ | Tore from jaw |

Alignment of Adhesive Strip and Foam-to-Foam Bond Strength

Foam-to-foam peel strength (1" wide foam) with a strip of Lord 7545 A/B urethane adhesive (¼" wide) at 100° C. along the length of the foam is shown in Table 8. Also shown in FIG. 8, foam-to-foam peel strength (1" wide foam) with a strip of Lord 7545 A/B urethane adhesive (¼" wide) at 100° C. perpendicular to the length of the foam.

TABLE 8

180° angle foam-to-foam peel adhesion at ca. 100° C. of overlapped foam

| | Average Peel (lb/inch) | Failure |
|---|---|---|
| Adhesive along length of the foam | 4.6+ | Layer of foam tore along the length of the foam |
| Adhesive perpendicular to the length of the foam | 5.6+ | Foam tore from jaw without separation |

Figure 7:
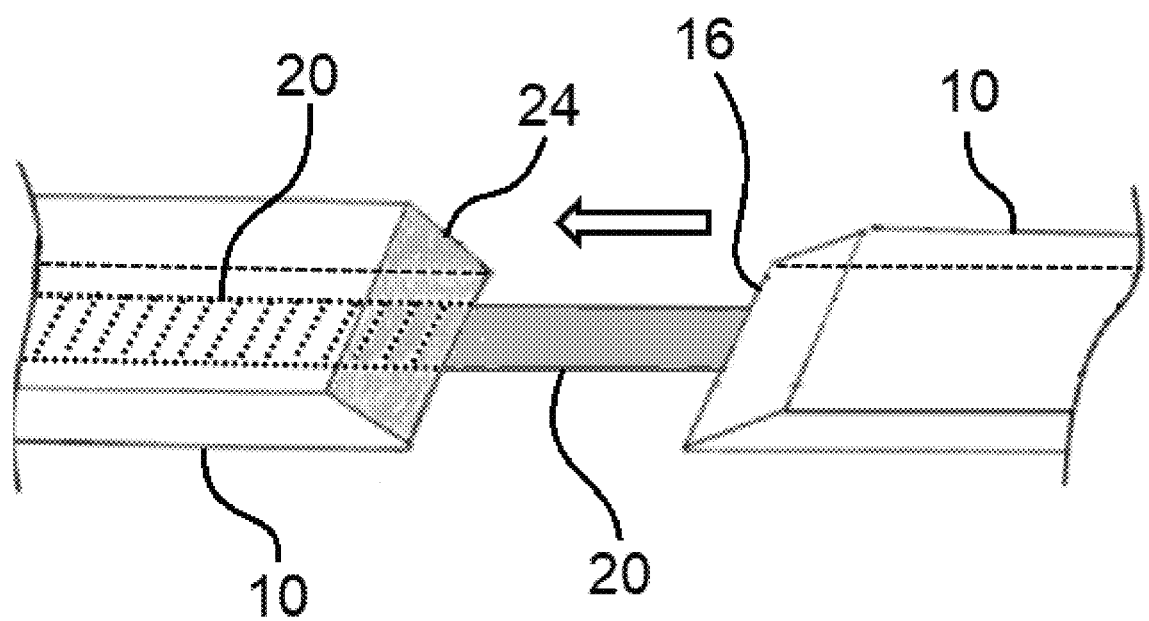
FIG. 7 is a view showing installation of noise damper.

FIG. 7 shows a single strip of adhesive 20 along the length of the inner surface of a tire. A foam noise damper 10 is inserted into the tire and contacts the adhesive 20. The width of the adhesive 20 is approximately 50% the width of the foam 10. During installation, the cut end with the foam-to-foam adhesive 24 is the first end inserted into the tire. The foam 10 is inserted until the second end 16 is inserted, at which point the second end 16 is overlapped onto the foam-to-foam adhesive 24. As illustrated in FIG. 7, the first end with the foam-to-foam adhesive 24 has been inserted and contacted the adhesive 20, which can be seen as the broken lines 20 (on the left side of the figure) under the foam 10; the second end 16 has not yet been applied to/contacted the adhesive, thus the adhesive strips are not shown.

Figure 10:
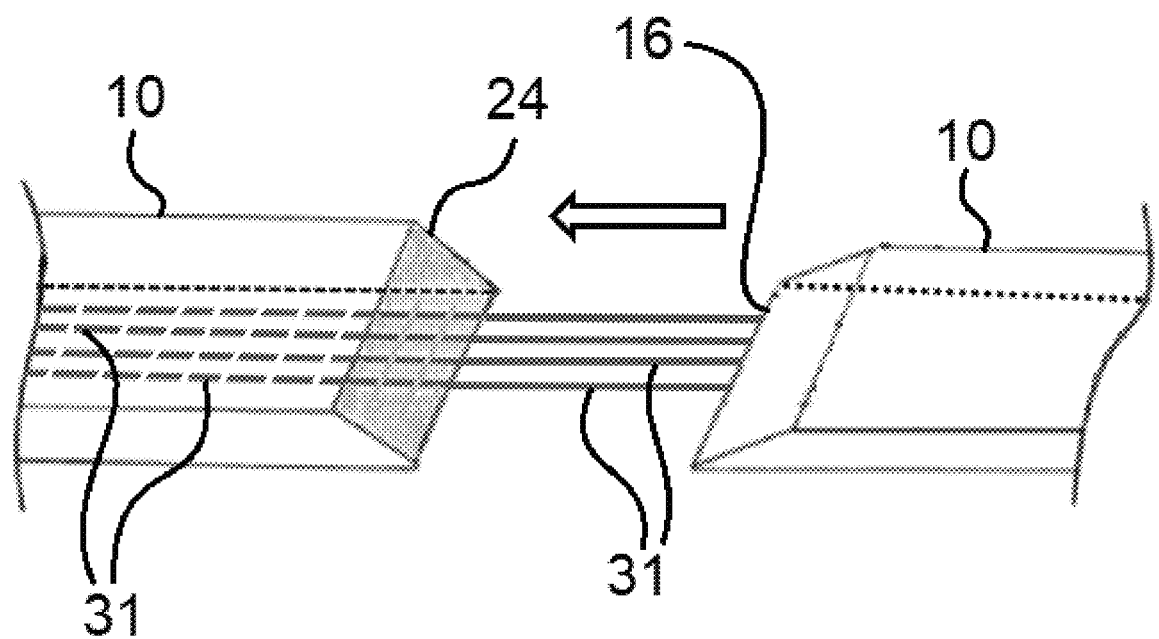
FIG. 10 is a view showing an alternate embodiment of an installation of noise damper.

FIG. 10 shows four strips of adhesive 31 along the length of the inner surface of a tire. A foam noise damper 10 is inserted into the tire and contacts the adhesives 31. During installation, the cut end with the foam-to-foam adhesive 24 is the first end inserted into the tire. The foam 10 is inserted until the second end 16 is inserted, at which point the second end 16 is overlapped onto the foam adhesive 24. As illustrated in FIG. 10, the first end with the foam-to-foam adhesive 24 has been inserted and contacted the adhesive strips 31, which can be seen as the broken lines 31 (on the left side of the figure) under the foam 10; the second end 16 has not yet been applied to/contacted the adhesive, thus the adhesive strips are not shown.

Figure 11:
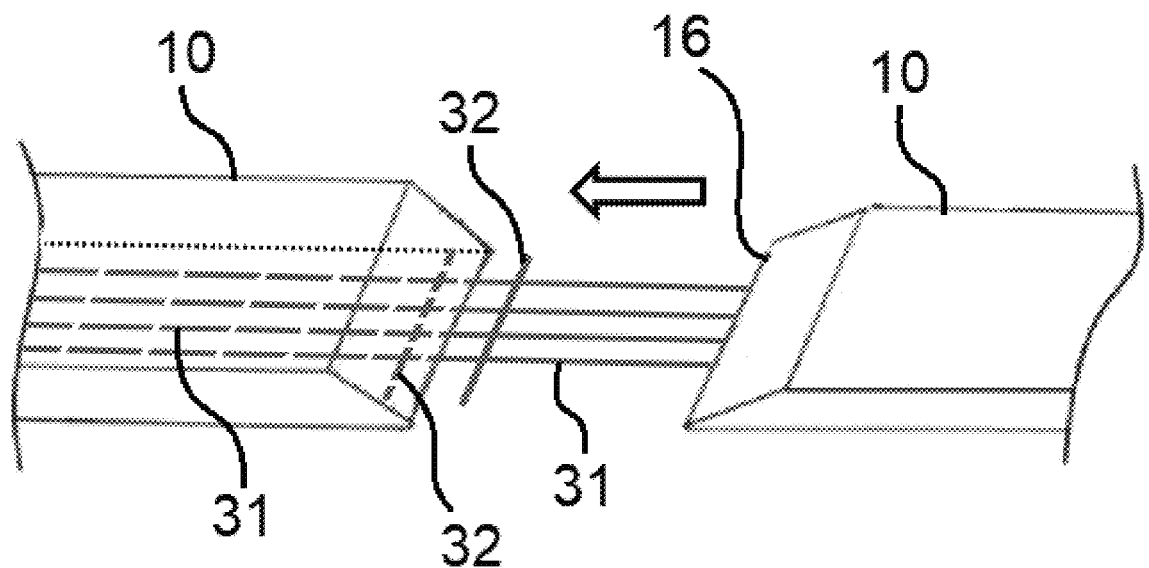
FIG. 11 is a view showing an alternate embodiment of an installation of noise damper using the adhesive shown in FIG. 9.

FIG. 11 shows an installation similar to the installation of FIG. 10, with four strips of adhesive 31 along the length of the interior surface of the tire that receives foam 10. Additional strips of perpendicular adhesive 32 are positioned to meet the ends of the foam and provide additional adhesion. (See FIG. 9 and Table 8).

Figure 9:
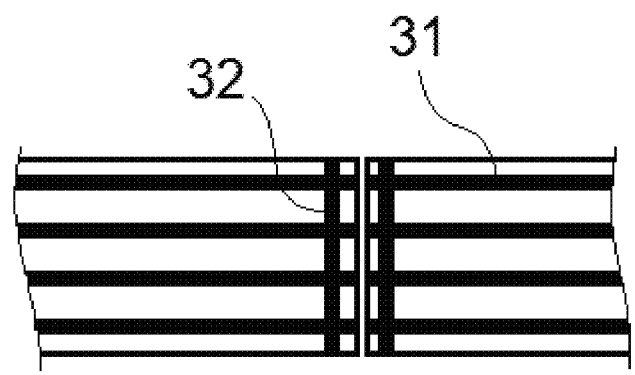
FIG. 9 is a partial cut-away view of the inner surface of a tire showing adhesive applied to inner tire surface.

FIGS. 9-11 show four strips of adhesive 31, but the invention is not intended to be limited to exactly four parallel strips. 2, 3, or 5 or more could be used. However, an arrangement using 4 strips was found to give good results, and thus this is arrangement illustrated.

Results and Discussion

Tables 5-7 show that Silane-modified polymer and urethane adhesives form strong bond to innerliner and to self at all tire operating temperature ranges. 8668 Acrylic pressure sensitive adhesive is also good at −40° C. and at 23° C. but adhesion drops at 75° C. to 0.48 lb/inch. If 8668 adhesive is used, it is preferred that the adhesion at the overlapped area should be enhanced by coating with second adhesive so that separation does not occur at high temperature. According to Table 5, 75° C. peel strength with 8668 adhesive is 0.48 lb/inch and it increased to 1.21+lb/inch if the 8668 surface is coated with silane-modified polymer.

Table 8 shows that at or near the overlapped area of both ends of the foam, if two strips of adhesive along the direction of the width of the foam are applied, then the bonding near the overlapped area can be significantly enhanced to prevent separation during tire use.

Proposed Method of Commercialization

One of many possible ways for commercialization is described below as follows. Purchase strip of foam where one end is cut at an angle of 45 degrees (with the other end cut at 90°) and its surface coated with acrylic pressure-sensitive adhesive, such as X16013, and the adhesive is protected using a release liner.

Take tire with innerliner free of mold release. Apply one or more annular strips of adhesive (e.g. Terosone MS9360) inside as described earlier. Equipment for adhesive application inside tire is available from SAR Electronic GmbH.

After removing release liner from one end of foam, insert foam starting with the adhesive-coated end. The foam length should be longer than the tire circumference. After the foam ends are joined by pressure-sensitive adhesive, the excess foam is cut and discarded. Equipment for inserting foam where foam ends overlapped is known in the art. In current product line, foam is of exact length to the internal circumference of tire and the ends are joined by an adhesive without overlap. Advantages of using the method of the present invention is that, one size foam ordered will fit many different tire sizes, thus reducing the inventory of foams in the plant.

Tire builds in the order of relative ease are described below. In all cases, foam was applied inside 45/35R19 tire where innerliner was kept clean by film method.

Figure 8A:
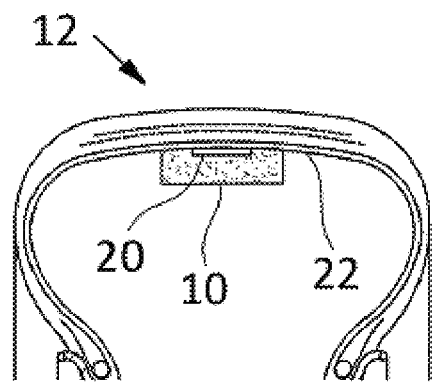
FIG. 8A is a cross-sectional view of tire of FIG. 7 showing foam attached using one wide strip of adhesive at the center of tire.
Figure 8B:
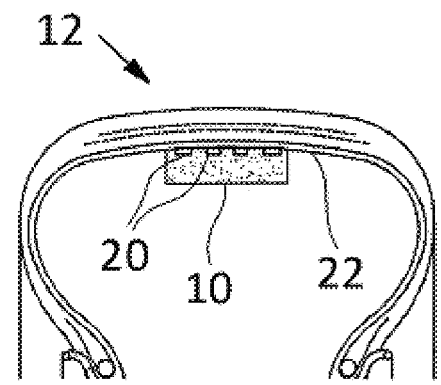
FIG. 8B is a cross-sectional view of an alternate embodiment of a tire showing foam attached using multiple narrow strips of adhesive.

Tire Build with One Adhesive Strip and One Common Adhesive for Innerliner and for Foam Overlap Foam of ca. density 0.03 g/cm$^3$ and dimensions 191.5 cm×8.5 cm×3 cm was taken where the two ends were cut at 45° angle. One strip of urethane adhesive was applied inside tire circumferentially in the center and the foam overlapped area was also joined by urethane (FIG. 7 and FIG. 8A). Tire was ready to put in the storage rack within 5 minutes and it was examined after 24 hours. As expected, based on Tables 5 and 6, strong foam-to-foam bond formation and foam-to-innerliner bond formation occurred. Weight of foam was 110.60 g and weight of urethane adhesive was 91.3 g.

Tire Build with One Adhesive Strip and Pressure-Sensitive Adhesive at the Region of Foam Overlap Tire build with pressure-sensitive adhesive at one end of foam and using Silane-modified polymer adhesive for foam to innerliner bonding. One strip of silane-modified polymer adhesive was applied circumferentially at the center of the inner surface of a tire. Release paper from one end of foam was removed. Then foam was inserted, starting with adhesive-applied end. Overlapped portion of the foam was pressed into the adhesive, and the tire was sent to storage. Final cure occurred over a few days and then the excess foam was cut flush with the remaining foam, such that the total foam thickness was not greater than 1.5 times the thickness of the foam at any point. Silane-modified polymer adhesive used was 130.09 g and final length of foam was 190.5 cm.

Tire Build with Four Narrow Adhesive Strips and Pressure-Sensitive Adhesive at the Region of Foam Overlap The process (as shown in FIGS. 9 and 11) was conducted in the same manner as the immediately preceding process above, except that four thin strips 31 (instead of a single strip) of silane-modified polymer were first applied to the inner surface of the tire, including two strips perpendicular 32 to the longitudinal strips 31 of length equivalent to foam width. These two perpendicular strips 32 are positioned to line up near the ends of the foam. Amount of silane-modified polymer adhesive used is in the range 30-55 g.

Figure 12:
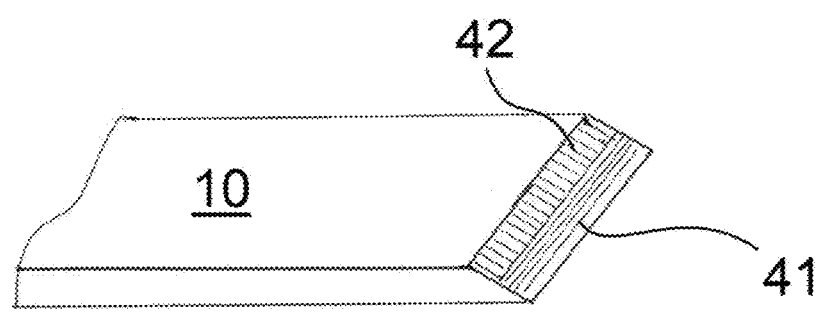
FIG. 12 is a view showing a foam end with dual adhesives.

FIG. 12 shows overlapped foam being joined by dual adhesives. The first adhesive 41 is instant bonding adhesive so that the tire can be removed immediately after build to a suitable location for stronger innerliner-to-foam bonding over time. The second adhesive 42 is a slow-curing adhesive that over time forms very strong flexible bond. The slow-cure adhesive 42 is fully capable of performing in a temperature range between −40° C. to +75° C. (silane-modified polymer adhesive in table 5). This dual adhesive arrangement can be used to join the ends of the foam noise dampers that are shown in FIGS. 3-7, 10, and 11.

The present invention reduces tire weight resulting in performance improvement by reducing the amount of adhesive used underneath foam for strong bonding. The present invention has a significantly lower weight of adhesive per square meter of foam noise damper. Prior art (e.g. US2016/0347127 to Yukawa) teaches foam attachment by sealant underneath of thickness 1-3 mm which corresponds to sealant (adhesive weight in the range 900-2700 g.)

The present invention uses acrylic pressure-sensitive adhesive of thickness (1-10 mil) i.e. (0.0025-0.025 cm) which corresponds to the pressure sensitive adhesive weight underneath entire foam surface in the range 30-300 g. Thus, there is 3-90-fold reduction in weight of adhesive use for foam attachment by pressure sensitive adhesive on the entire foam surface underneath which is significant.

Prior art (e.g. US2016/0347127 to Yukawa) teaches foam attachment in sealant tire where a thick (1-3 mm) sealant (adhesive) is used underneath the entire foam surface. Strip of adhesive will significantly impair nail hole sealing capability in USPA'127. Thus, the present invention would not work with some prior art, such as Yukawa, for example. In the present invention, strips of adhesives were utilized and the amount of adhesive used is not optimized to-date. Large number of tire builds showed total adhesives (silane-modified polymer or urethane) strip weight underneath foam is in the range 219-804 g per square meter of foam, which is significantly lower than in USPA'127 in the range 900-2700 g per square meter of foam.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated.

What is claimed is:

1. A tire comprising:
   a circumferential tread having an outer tread surface and an inner innerliner surface;
   at least two spaced-apart beads;
   sidewall portions extending between the tread and the beads; and
   a belt-like foam noise damper having first and second terminal ends,
   wherein the noise damper lines said innerliner surface;
   wherein the noise damper is secured to said innerliner surface via an adhesive situated between said noise damper and said innerliner,
   wherein the terminal ends of said noise damper are cut at an angle of less than 90 degrees, overlap each other, and the overlapped second terminal end of the foam is joined to the first terminal end by a non-pressure-sensitive adhesive present underneath the second terminal end, and
   wherein said adhesive has weight in the range of 30 to 800 grams per square meter of foam surface.

2. The tire of claim 1 wherein the terminal ends are cut at an angle of between about 5 degrees and about 65 degrees.

3. The tire of claim 1 wherein the terminal ends are cut at an angle of between about 10 degrees and 55 degrees.

4. The tire of claim 1 wherein the terminal ends are cut at an angle of about 40 degrees to 50 degrees.

5. The tire of claim 1 wherein the terminal ends are cut at an angle of about 45 degrees.

6. The tire of claim 1 wherein the terminal ends are cut at the same angle.

7. The tire of claim 1 wherein the terminal ends are cut at different angles.

8. The tire of claim 1 wherein said adhesive is a pressure-sensitive adhesive.

9. The tire of claim 1, wherein said overlapped foam is joined by adhesive selected from cyanoacrylate adhesive and urethane adhesive.

10. The tire of claim 1, wherein said overlapped foam is joined by a combination of silane-modified polymer adhesive and instant adhesive, wherein said instant adhesive is selected from pressure sensitive acrylic adhesive, urethane adhesive and cyanoacrylate adhesive.

11. The tire of claim 1, wherein said adhesive defines a first strip of adhesive, and further comprising a second strip of adhesive applied perpendicular to said first strip, wherein said second strip's length is approximately equal to the width of said foam, and wherein said second strip is applied to the innerliner and situated to contact a portion of said second terminal end of the foam.

12. The tire of claim 1, wherein said overlapped foam is joined by first and second adhesives, wherein said first adhesive is instant bonding adhesive such that the tire can be removed immediately after build, and wherein said second adhesive is a slow-curing adhesive that forms very strong flexible bond in a temperature range between −40° C. to +75° C.

13. The tire of claim 1, wherein said adhesive comprises 1 to 5 parallel strips of adhesive.

14. Tire of claim 8 wherein the pressure-sensitive adhesive is an acrylic pressure-sensitive adhesive.

15. Tire of claim 8 wherein the pressure-sensitive adhesive weight is in the range 30 to 300 grams per square meter of foam surface.

16. Tire of claim 13 wherein the adhesive strips comprise silane-modified polymer adhesive.

17. Tire of claim 13 wherein the adhesive strips comprise urethane adhesive.

18. The tire of claim 1, wherein said foam has a width and said adhesive comprises a single band of adhesive having a width of about 50% of the width of said foam.

* * * * *